United States Patent [19]
Taniguchi et al.

[11] Patent Number: 5,224,167
[45] Date of Patent: Jun. 29, 1993

[54] SPEECH CODING APPARATUS USING MULTIMODE CODING

[75] Inventors: Tomohiko Taniguchi, Yokohama; Yoshinori Tanaka, Kawasaki; Akira Sasama, Fuji; Yasuji Ohta, Yokohama; Fumio Amano, Tokyo; Shigeyuki Unagami, Atsugi, all of Japan

[73] Assignee: Fujitsu Limited, Kawasaki, Japan

[21] Appl. No.: 580,669

[22] Filed: Sep. 11, 1990

[30] Foreign Application Priority Data

Sep. 11, 1989 [JP] Japan .................. 1-235274

[51] Int. Cl.$^5$ .................. G10L 5/00; G10L 3/02; G10L 7/02
[52] U.S. Cl. .................. 381/36; 381/30; 381/31; 381/38
[58] Field of Search .................. 381/29-40

[56] References Cited

U.S. PATENT DOCUMENTS

| | | | |
|---|---|---|---|
| 4,516,259 | 5/1985 | Yato et al. | 381/30 |
| 4,802,171 | 1/1989 | Rasky | 381/31 |
| 4,811,396 | 3/1989 | Yatsuzuka | 381/38 |
| 4,831,636 | 5/1989 | Taniguchi et al. | 375/27 |

FOREIGN PATENT DOCUMENTS

| | | |
|---|---|---|
| 0310110A2 | 9/1988 | European Pat. Off. . |
| 0310110A3 | 9/1988 | European Pat. Off. . |
| WO8504276 | 3/1984 | PCT Int'l Appl. . |

OTHER PUBLICATIONS

Quantization Procedures for the Excitation in CELP Coders by Peter Kroon and Bishnu Atal (1987, vol. 3 of 4, IEEE) Acoustics, Speech, and Signal Processing.

Primary Examiner—Dale M. Shaw
Assistant Examiner—Kee M. Tung
Attorney, Agent, or Firm—Staas & Halsey

[57] ABSTRACT

A speech coding apparatus coupled to a transmission channel includes m (m is an integer greater than 1) coders, m decoders and m or (m−1) error correcting coders. The apparatus also includes an evaluation unit which evaluates a quality of each of reproduced speech signals from the input speech signal and the reproduced speech signals and which outputs an evaluated quality of each of the reproduced speech signals. The quality of each of the reproduced speech signals is evaluated in a state having no transmission error. A decision unit identifies one of the m coders which provides the reproduced speech signal having a smallest distortion on the basis of the evaluated quality of each of the reproduced speech signals, a current error rate of the transmission channel and error correcting abilities of the error correcting coders, and generates a coder identification number representative of a selected one of the m coders. An output part outputs a multiplexed transmission signal including the coded speech signal generated by the one of the m coders identified by the decision unit and the error correcting code generated by a corresponding one of the m error correcting coders.

19 Claims, 8 Drawing Sheets

|  |  | A MODE (BITS/FRAME) | B1 MODE (BITS/FRAME) | B2 MODE (BITS/FRAME) |  |
|---|---|---|---|---|---|
| SYNCHRONIZTION | | 1 | 1 | 1 | |
| MODE (A/B) | | 1 | 2 | 2 | |
| FEC-0 | | 2 | 2 | 2 | |
| LPC PARAMETCRS : k | | 4,4,4,4,3,3 3,3,2,2 = 32 | 4 × 4 = 16 | 4 × 4 = 16 | FEC-1 |
| | | | 5 × 1 = 5 | 5 × 1 = 5 | FEC-2 |
| | | | 5 × 2 = 10 | | FEC-3 |
| | | | | 5 × 2 = 10 | FEC-4 |
| PITCH | DELAY : p | 6 × 4 = 24 | 24 | 24 | |
| | GAIN : b | 4 × 4 = 16 | 16 | 16 | |
| CODEBOOK | INDEX : c | 6 × 8 = 48 | 48 | 48 | |
| | GAIN : g | 5 × 4 = 20 | 20 | 20 | |
| TOTAL (FRAME = 30 ms) | | 144 (4.8 kb/s) | 144 (4.8 kb/s) | 144 (4.8 kb/s) | |

FIG. 5

|  | FORWARD ERROR CORRECTING CODE | PROTECTED TRANSMISSION BITS | |
|---|---|---|---|
|  |  | B1 MODE | B2 MODE |
| FEC-1 | (15,11) HAMMING × 4 | PITCH DELAY (24 BITS) PITCH GAIN (16 BITS) CODE GAIN - MBS (4 BITS) = 44 BITS | PITCH DELAY (24 BITS) PITCH GAIN (16 BITS) CODE GAIN - MBS (4 BITS) = 44 BITS |
| FEC-2 | (21,16) HAMMING | CODE GAIN (16 BITS) | CODE GAIN (16 BITS) |
| FEC-3 | (21,16)* HAMMING × 2 | LPC PARAMETERS OF LAST FRAME (32 BITS) | |
| FEC-4 | (29,24)* HAMMING × 2 | | CODE INDEX (48 BITS) |

(*: SHORTENED HAMMING CODE)

SPEECH CODING APPARATUS USING MULTIMODE CODING

CROSS-REFERENCE TO RELATED APPLICATION

The subject application is related to U.S. application Ser. No. 515,430 filed Apr. 27, 1990 and entitled "SPEECH CODING APPARATUS," the inventors of which are common to five of the six inventors herein and which application is commonly assigned to the assignee herein, Fujitsu Limited.

BACKGROUND OF THE INVENTION

The present invention generally relates to a speech coding apparatus, and more particularly to a speech coding apparatus for compressing speech information and transmitting compressed speech information. More specifically, the present invention is concerned with a speech coding apparatus using a multimode coding, such as code excited linear predictive coding (CELP).

Recently, there has been a growing demand for a high-efficiency speech coding apparatus capable of compressing speech information in communication systems, such as intracompany communication systems, digital mobile radio communication systems and speech information storing and answering systems. Particularly, in communication systems having a poor channel condition, such as digital mobile radio communication systems, there is a demand for a speech coding apparatus which can correctly process digital data having transmission errors.

Figure 1:
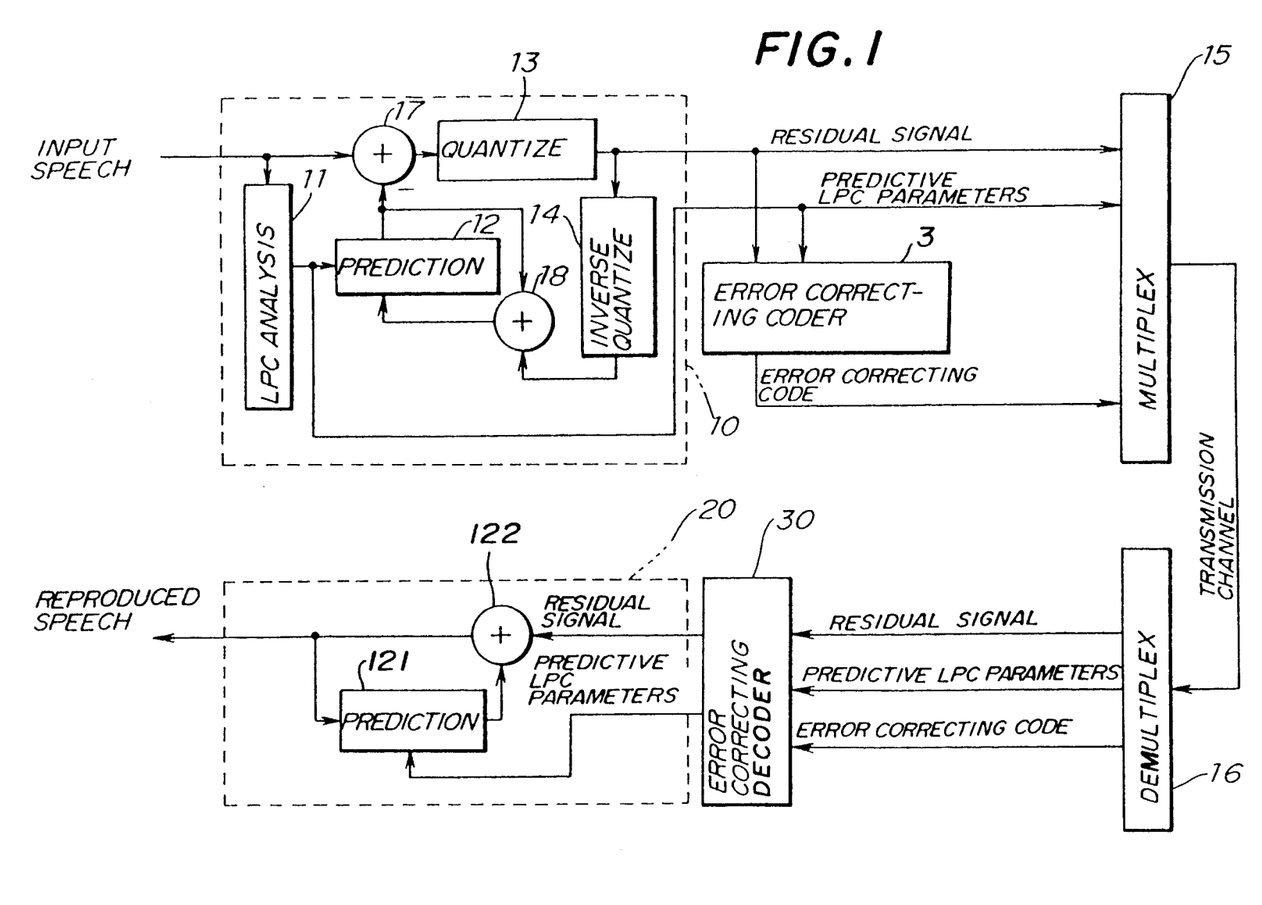
FIG. 1 is a block diagram of a communication system having a conventional speech coding apparatus and a speech decoding apparatus.

Referring to FIG. 1, there is illustrated a conventional speech coding system having a transmitter and a receiver. The transmitter is composed of a speech coder 10, an error correcting coder 3, a multiplexer unit 15 and two error detectors 17 and 18. The receiver is composed of a demultiplexer unit 16, an error correcting decoder 30 and a speech decoder 20. The speech coder 10 is made up of a linear predictive coding (LPC) analyzer 11, a predictor 12, a quantizer 13 and an inverse quantizer 14. An input speech signal is applied to the LPC analyzer 11, which carries out a linear predictive coding (LPC) analysis for the input speech signal for every frame and which generates linear predictive coding (LPC) parameters (coefficients). The predictor 12 generates a prediction signal obtained from the LPC parameters related to the current frame. The subtracter 17 calculates the difference between the input speech signal and the prediction signal generated and output by the predictor 12. This difference is sent, as a residual signal, to the quantizer 13, which quantizes the residual signal. The inverse quantizer 14 inversely quantizes the quantized residual signal and sends an inverse-quantized residual signal. The error detector 18 adds the inverse-quantized residual signal to the prediction signal and outputs a reproduced signal to the predictor 12. The quantized residual signal generated and output by the quantizer 13 and the LPC parameters generated and output by the LPC analyzer 11 are sent, via the quantizer 13 for LPC parameters, to the multiplexer unit 15, which generates a multiplexed transmission signal.

In a case where errors frequently occur in the multiplexed transmission signal on a transmission channel, the error correcting coder 3 is employed, as shown in FIG. 1. The error correcting coder 3 carries out an error correction coding scheme for the quantized residual signal and the quantized LPC parameters and sends error correcting codes to the multiplexer unit 15. The multiplexer unit 15 multiplexes the error correcting codes together with the quantized residual signal and the quantized LPC parameters.

The demultiplexer 16 of the receiver receives the multiplexed transmission signal via the transmission channel, and restores the residual signal, the LPC parameters and the error correcting codes. The error correcting decoder 30 receives these signals and outputs an error-corrected residual signal and error-corrected LPC parameters. The speech decoder 20 includes a predictor 121 and an error detector 122, and outputs a reproduced speech signal from the error-corrected residual signal and the error-corrected LPC parameters.

Conventionally, the multiplexed transmission signal has a predetermined bit rate. A fixed error correcting ability (provided by fixed error correcting codes) is used for coded information on speech (which consists of the residual signal and the LPC parameters). In other words, the ability to correct transmission errors is not changed. Thus, error correction coding of the residual signal and the LPC parameters is always carried out at a fixed rate irrespective of the transmission channel condition.

It will be noted that speech coding is primarily directed to eliminating redundancy from a speech signal and compressing speech information. The employment of error correction coding is redundant and is not desirable in view of information compression. For example, the error correction coding is designed, taking into account an expected poor transmission channel condition. That is, the error correcting ability is designed, while taking into consideration such an expected poor transmission channel condition. As has been described previously, the fixed error correcting ability is always used. Thus, even if the transmission channel has a good condition and there is less transmission error, the fixed error correcting ability is excessive. This decreases the efficiency of information compression.

On the other hand, if a low error correcting ability is allocated to the transmission signal, it becomes difficult to sufficiently carry out error correction. This deteriorates the quality of reproduced speech.

SUMMARY OF THE INVENTION

It is a general object of the present invention to provide an improved speech coding apparatus in which the above-mentioned disadvantages are eliminated.

A more specific object of the present invention is to provide a speech coding apparatus capable of efficiently and effectively carrying out speech coding and error correction coding.

The above-mentioned objects of the present invention are achieved by a speech coding apparatus coupled to a transmission channel, comprising:

m (m is an integer greater than 1) coders coding an input speech signal for every frame of the input speech signal to thereby generate coded speech signals having mutually different bit rates;

m decoders respectively provided for the m coders and generating reproduced speech signals from the coded speech signals for every frame;

m−1 error correcting coders provided for the m coders and carrying out, for every frame, an error correction coding for the coded speech signals to thereby generate error correcting codes having mutually different error correcting abilities;

evaluating means, coupled to the m decoders, for evaluating a quality of each of the reproduced speech signals from the input speech signal and the reproduced speech signals and for outputting an evaluated quality of each of the reproduced speech signals, the quality of each of the reproduced speech signals being evaluated in a state having no transmission error;

decision means, coupled to the evaluating means, for identifying one of the m coders which provides the reproduced speech signal having a smallest distortion on the basis of the evaluated quality of each of the reproduced speech signals, a current error rate of the transmission channel and the error correcting abilities of the error correcting coders and for generating a coder identification number representative of the one of the m coders; and output means, coupled to the m coders, the m error correcting coders and the decision means, for outputting a multiplexed transmission signal including the coded speech signal generated by the one of the m coders identified by the decision means and the error correcting code generated by a corresponding one of the m error correcting coders.

The aforementioned objects of the present invention are also achieved by a speech coding apparatus coupled to a transmission channel, comprising:

m (m is an integer greater than 1) coders coding an input speech signal for every frame of the input speech signal to thereby generate coded speech signals having mutually different bit rates;

m decoders respectively provided for the m coders and generating reproduced speech signals from the coded speech signals for every frame;

(m−1) error correcting coders provided for (m−1) coders from among the m coders and carrying out, for every frame, an error correction coding for the coded speech signals generated by the (m−1) coders to thereby generate error correcting codes having mutually different error correcting abilities;

evaluating means, coupled to the m coders and the m decoders, for evaluating a quality of each of the reproduced speech signals from the input speech signal and the reproduced speech signals and for outputting an evaluated quality of each of the reproduced speech signals, the quality of each of the reproduced speech signals being evaluated in a state having no transmission error;

decision means, coupled to the evaluating means, for identifying one of the m coders which provides the reproduced speech signal having a smallest distortion on the basis of the evaluated quality of each of the reproduced speech signals, a current error rate of the transmission channel and error correcting abilities of the (m−1) error correcting coders and for generating a coder identification number representative of the one of the m coders; and output means, coupled to the m coders, the (m −1) error correcting coders and the decision means, for outputting a multiplexed transmission signal including the coded speech signal generated by the one of the m coders identified by the decision means and including the error correcting code generated by a corresponding one of the (m−1) error correcting coders when the one of the m coders identified by the decision means is one of the (m−1) coders associated with the (m−1) error correcting coders.

The aforementioned objects of the present invention are also achieved by a speech coding apparatus coupled to a transmission channel, comprising:

m (m is an integer greater than 1) coders coding an input speech signal for every frame of the input speech signal to thereby generate coded speech signals having mutually different bit rates, each of the m coders having a linear predictor;

analyzing means for carrying out a linear predictive coding (LPC) analysis for the input speech signal for every frame and for generating LPC parameters;

(m−1) error correcting coders provided for (m−1) coders from among the m coders and carrying out, for every frame, an error correction coding for the coded speech signals generated by the (m−1) coders to thereby generate error correcting codes having mutually different error correcting abilities;

evaluating means, coupled to the analyzing means, for evaluating a quality of a reproduced speech signal reproduced by using current LPC parameters and previous LPC parameters and for outputting an evaluated quality obtained in a state having no transmission error, the evaluated quality showing a spectral distortion;

decision means, coupled to the evaluating means, for identifying one of the m coders which provides a reproduced speech signal having a smallest distortion on the basis of the evaluated quality, a current error rate of the transmission channel and error correcting abilities of the (m−1) error correcting coders and for generating a coder identification number representative of the one of the m coders; and output means, coupled to the m coders, the (m −1) error correcting coders and the decision means, for outputting a multiplexed transmission signal including the coded speech signal generated by the one of the m coders identified by the decision means and including the error correcting code generated by a corresponding one of the (m−1) error correcting coders when the one of the m coders identified by the decision means is one of the (m−1) coders associated with the (m−1) error correcting coders.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 2:
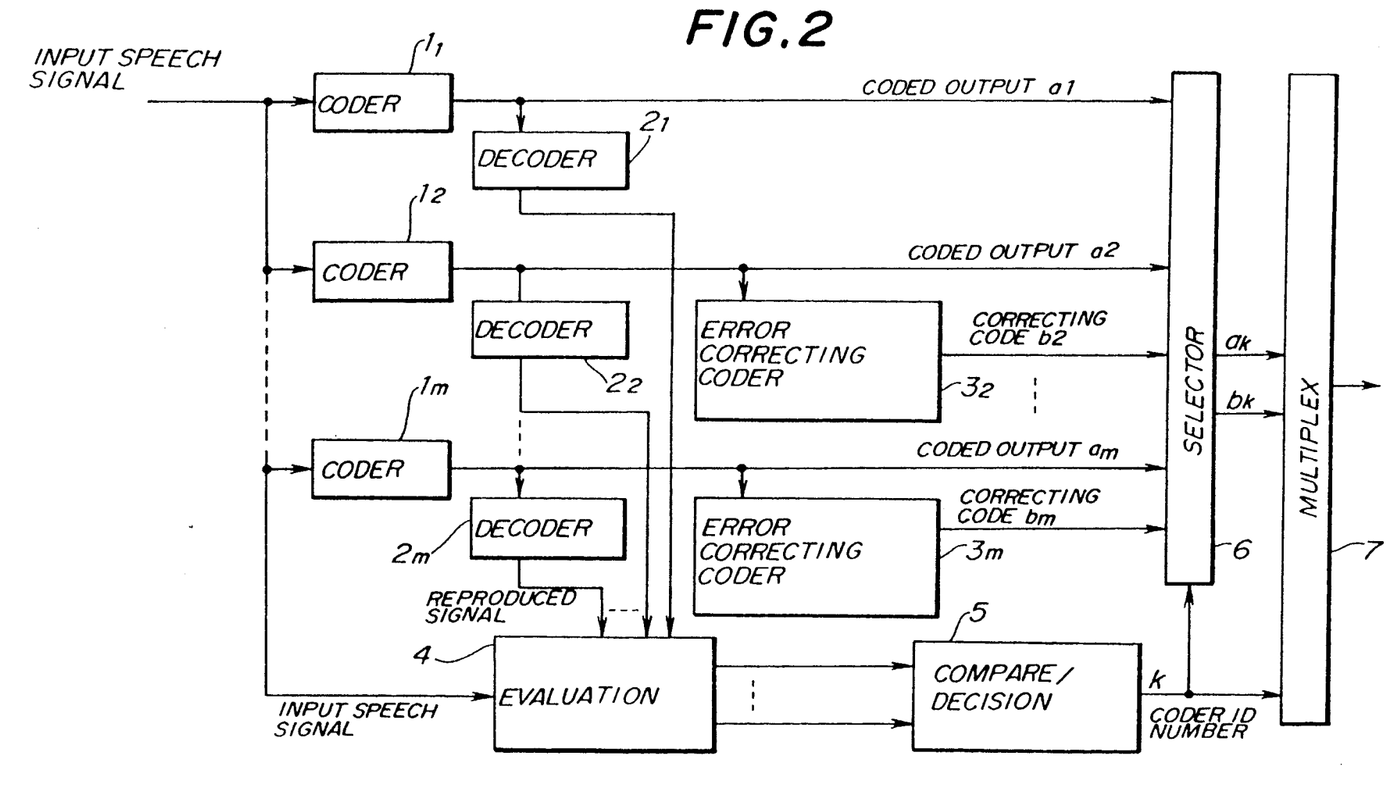
FIG. 2 is a block diagram of a speech coding apparatus according to a first preferred embodiment of the present invention.

Referring to FIG. 2, there is illustrated a speech coding apparatus according to a first preferred embodiment of the present invention. The speech coding apparatus shown in FIG. 2 has a plurality of coders $1_1-1_m$ (m is an integer greater than 1), which respectively code an input speech signal at different bit rates per frame (different information amounts). Decoders $2_1-2_m$ are provided respectively for the coders $1_1-1_m$. The decoders $2_1-2_m$ decode coded speech signals generated and output by the coders $1_1-1_m$, respectively, and output reproduced speech signals. Error correcting coders $3_2-3_m$ carry out error correction coding for the coded speech signals (speech coding information) generated and output by the coders $1_1-1_m$, and output error correcting codes. An evaluation unit 4 receives the reproduced speech signals generated and output by the decoders $2_1-2_m$ and the input speech signal and generates, therefrom, evaluation functions of qualities of the reproduced speech signals which have no transmission errors. A comparison/decision unit 5 receives the evaluation functions generated and output by the evaluation unit 4 and a current error rate of a transmission channel which is output by an exchanger (not shown) installed in an exchange office. The comparison/decision unit 5 calculates a distortion amount from the current error rate and the error correcting ability of each of the error correcting coders $3_2-3_m$ with respect to the current error rate. Then, the comparison/decision unit 5 selects, on the basis of the evaluation functions and the calculated distortion amount, one error correcting decoder from among the error correcting coders $3_2-3_m$ which provides the reproduced speech signal having the smallest distortion. Then, the comparison/decision unit 5 sends a coder identification number of the selected coder to a selector 6. The selector 6 selects the coded speech signal generated and output by the coder specified by the comparison/decision unit 5 as well as an associated error correcting code. A multiplexer 7 receives the selected coded speech signal, the selected error correcting code and the coder identification number and multiplexes these signals to thereby generate a multiplexed transmission signal having a constant bit rate.

A plurality (m−1) of coder-error correcting coder sets process mutually different ratios of the number of error correcting bits per frame to the number of information bits per frame (different ratios of the amount of error correcting codes to the amount of speech information). The sum of the number of bits of the coded speech signal per frame and the number of error correcting bits per frame for each of the coder-error correcting code sets are identical to each other. The comparison/decision unit 5 selects, for every frame, the optimum coder-error correcting coder set. The sum of the transmission amount of coded speech signal $a_i (i=1, 2, \ldots, m)$ and the transmission amount of error correcting code $b_i$ is equal to a fixed bit rate c of the transmission channel.

During operation, the reproduced speech signals generated and output by the decoders $2_1-2_m$ and the input speech signal are input to the evaluation unit 4, which compares, for every frame, each of the reproduced speech signals with the input speech signal. The m comparison results in the form of evaluation functions show the qualities of the reproduced speech signals related to the coders $1_1-1_m$ where there are no transmission errors.

The comparison/decision unit 5 receives the evaluation functions generated and output by the evaluation unit 4 and the current error rate related to the transmission channel. The comparison/decision unit 5 calculates the amount of distortion from the current error rate and the error correcting ability of each of the error correcting coders $3_2-3_m$ with respect to the current error rate. Then, the comparison/decision unit 5 selects, on the basis of the evaluation functions and the calculated distortion amount, one error correcting decoder from among the error correcting coders $3_2-3_m$ which provides the reproduced speech signal having the smallest distortion. Then, the comparison/decision unit 5 sends the coder identification number, k ($1 \leq k \leq m$) of the selected coder to a selector 6. It will be noted that when one coder is selected, the corresponding error correcting coder is automatically specified.

It is now assumed that the error correcting abilities of the error correcting coders $3_i (i=2m)$ increase with an increase in the number m. If there is no transmission error, speech reproduced from the coded speech signal $a_m$ will have a quality less than that of speech reproduced from the coded speech signal $a_1$. On the other hand, if there are many transmission errors, speech reproduced from the coded speech signal $a_m$ will have a quality higher than that of speech reproduced from the coded speech signal $a_1$.

The comparison/decision unit 5 selects, for every frame, one coder from among the coders $1_1-1_m$ which provides the highest reproduced speech quality and sends the corresponding coder identification number k to the selector 6. The selector 6 selects the coded speech signal $a_k$ and the corresponding error correcting code $b_k$ and sends the same to the multiplexer unit 7.

In the above-mentioned way, the error correcting ability to correct errors contained in the coded speech signal information is always optimized dynamically. On the receiver side, the error correcting decoder 30 and the decoder 20 operate in accordance with the coder identification number k which is transmitted from the transmitter side.

Figure 3:
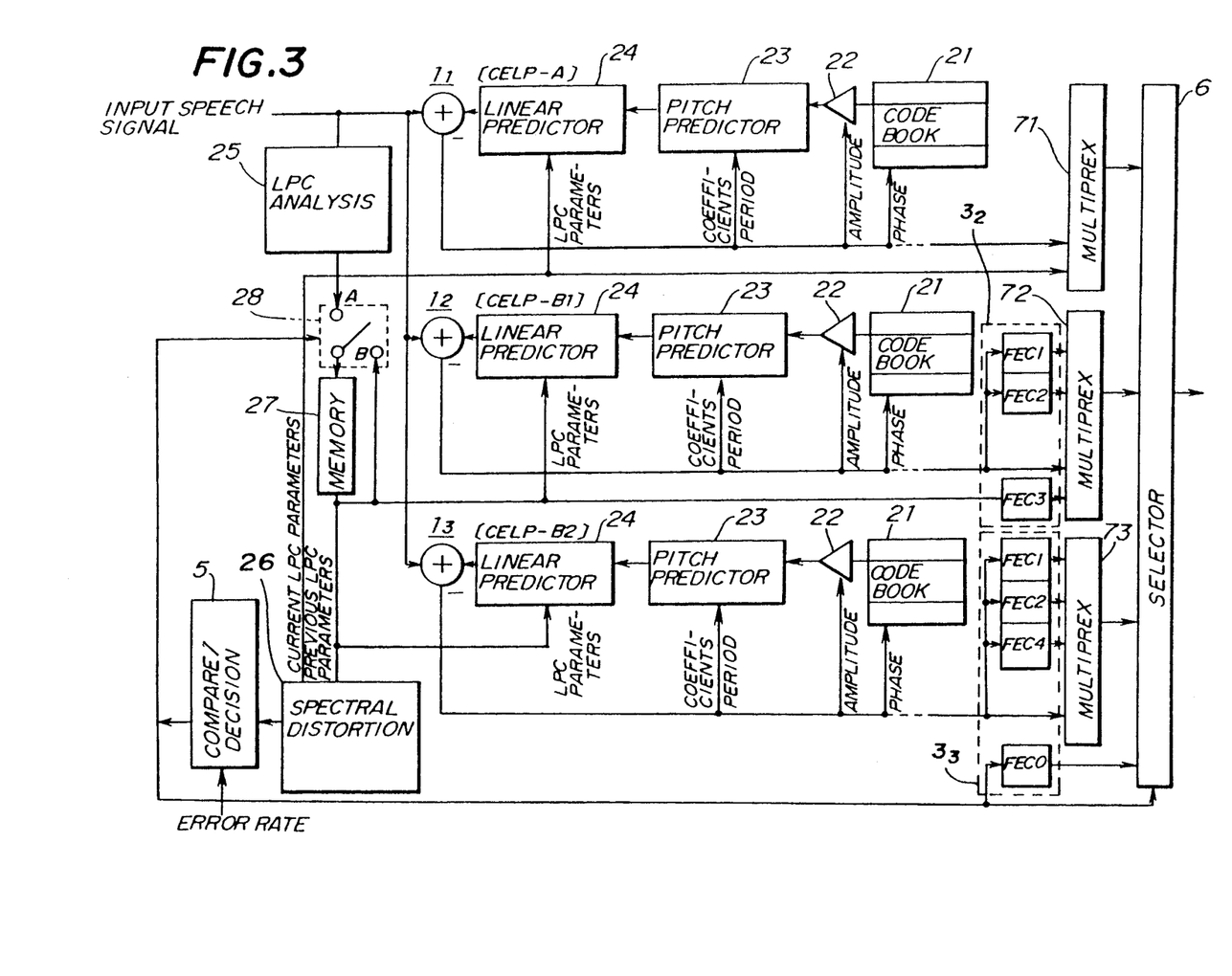
FIG. 3 is a more detailed block diagram illustrating the structure of the speech coding apparatus shown in FIG. 2.

FIG. 3 illustrates the more detailed configuration of the speech coding apparatus shown in FIG. 2. Each of the coders $1_1-1_m$ is of a conventional code excited linear predictive coding (CELP) type coder, and is composed of a code book 21, a gain amplifier 22, a pitch predictor 23 and a linear predictor 24. A CELP coder has been proposed in, for example, B. S. Atal and M. R. Schroeder, "STOCHASTIC CODING OF SPEECH AT VERY LOW BIT RATE", Proc.ICASSP '84, pp.1610-1613, 1984, or U.S. patent application Ser. No. 515,430, the disclosure of which is hereby incorporated by reference.

Figure 4:
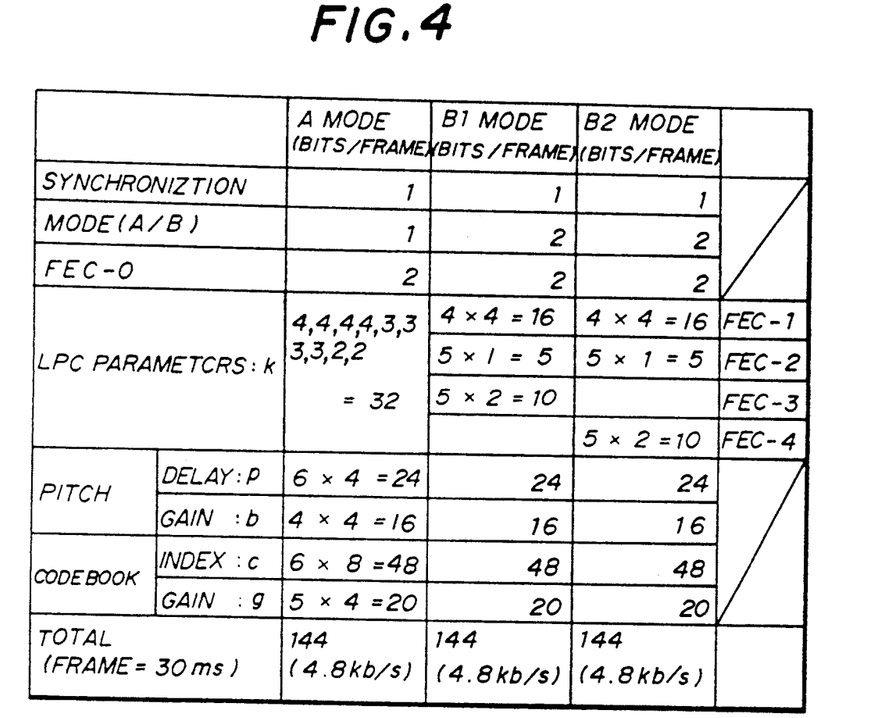
FIG. 4 is a diagram illustrating bit allocations of transmission information.

Any one of the following evaluation functions can be used in the evaluation unit 4:

i) Waveform distortion, such as a signal-to-noise ratio (S/N ratio) in each frame;

ii) Spectral distortion, such as LPC (linear predictive coding) Cepstrum distance; or iii) a combination of the above i) and ii).

The speech coding apparatus shown in FIG. 3 uses the evaluation function which evaluates spectral distortion. The evaluation unit 4 shown in FIG. 2 is made up of a linear predictive coding (LPC) analyzer 25 and a spectral distortion calculator 26. It will be noted that the speech coding apparatus shown in FIG. 3 has no decoders $2_1-2_m$, since there is no need to evaluate the waveform distortion.

The speech coding apparatus shown in FIG. 3 has three coder-error correcting coder sets (three modes). Hereinafter, the three modes are respectively referred to as A mode, B1 mode and B2 mode. As shown in FIG. 4, the bit allocations of the three modes A, B1 and B2 are different from each other, but have an identical bit rate of 4.8 kbs (144 bits). Hereinafter, B1 and B2 modes are generally referred to as B mode simply.

Each of the modes is provided in common with control data including a frame synchronization bit, a mode selection bit or bits, error correction coding bits labeled FEC0 (Forward Error Correcting) for the mode selection bit or bits, gain (coefficient), pitch prediction bits (delay (period)), and code book bits (index (phase), gain (amplitude)).

In A mode, all bits of the transmission signal are used for transmitting the coded speech signal generated and output by the coder $1_1$ composed of the code book 21, the gain amplifier 22, the pitch predictor 23 and the linear predictor 24. Thus, A mode uses no error correcting coder.

Each of the code books 21 stores a plurality of random samples. The random samples are read out from each of the code books 21 one by one and the optimum random sample providing the smallest error between the input speech signal and the reproduced speech signal output by the linear predictor 24 is selected. The gain of the gain amplifier 22 is determined so that the smallest error is output. The delay (period) and the gain (coefficient) of the pitch predictor 23 are determined so that the smallest error is output. The LPC parameters of the linear predictor 24 are determined by analyzing current frame data.

In A mode, the coder $1_1$ carries out the LPC analysis for every frame of the input speech signal and sends LPC parameters to a destination terminal together with the above-mentioned information. On the other hand, in both B1 mode and B2 mode, LPC parameters are not sent to the destination, and 32 transmission bits allocated to the LPC parameters in A mode are used for transmitting error correcting bits.

The error correcting coder $3_2$ shown in FIG. 2 corresponds to the combination of FEC1, FEC2 and FEC3 shown in FIG. 3. FEC1, FEC2 and FEC3 are Hamming codes as defined in FIG. 5. The error correcting coder $3_3$ (m=3) shown in FIG. 2 corresponds to the combination of FEC0, FEC1, FEC2 and FEC4 which are as defined in FIG. 5.

A multiplexer unit 71 multiplexes the aforementioned control data and the LPC parameters and outputs a multiplexed signal to the selector 6. A multiplexer unit 72 multiplexes the aforementioned control data of the coder $1_2$, the error correcting codes FEC1 and FEC2 with respect to these control data, and the error correcting codes FEC3 with respect to the LPC parameters which were transmitted in the most recent A mode frame. A multiplexer unit 73 multiplexes the aforementioned control data of the coder $1_3$, and the error correcting codes FEC1, FEC2 and FEC4 with respect to these parameters. The multiplexed signals generated and output by the multiplexer units 71, 72 and 73 are sent to the selector 6, which selects one of the three multiplexed signals and transmits the same together with the coder identification number output from the comparison/decision unit 5 and the error correcting code FEC0 with respect to the coder identification number (mode selection bit or bits). It will be noted that in the arrangement shown in FIG. 3, multiplexing is carried out first and the selecting procedure is carried out second.

A memory 27 stores the LPC parameters transmitted in the last frame in A mode (the most recent A mode frame). A switch 28 is provided between the LPC analyzer 25 and the memory 27. In A mode, the switch 28 selects the LPC analyzer 25. On the other hand, in B1 mode and B2 mode, the selector 28 selects the output terminal of the memory 27, which stores the LPC parameters transmitted in the most recent A mode frame. The switch 28 is controlled by the comparison/decision unit 5, as will be described in detail later.

It will be noted that in B1 and B2 modes, the LPC parameters are not updated and therefor the LPC parameters stored in the memory 27 are used. Thus, if there is a great difference between the LPC parameters related to the consecutive frames, a spectral distortion will occur in reproduced speech.

In order to evaluate the spectral distortion, the spectral distortion calculator 26 calculates the distance between LPC parameters of consecutive frames (present frame and previous frame), $SN_{LAR}$, as defined in the following expression.

$$SN_{LAR} = 10 \log \Sigma \{(y_A^{(i)})^2\} / \{(y_A^{(i)} - y_B^{(i)})^2\}$$

where
$y_A^{(i)}$: LPC parameters of A mode (LAR), and
$y_B^{(i)}$: LPC parameters of B1 or B2 mode (LAR)

The comparison/decision unit 5 determines a threshold value Th (which will be described later) based on the current error rate (BER) of the transmission channel, which is transmitted from an exchanger in an exchange office. Then, the comparison/decision unit 5 compares the aforementioned spectral distortion $SN_{LAR}$ with the threshold value Th and makes a decision on which one of the three mode should be selected on the basis of the comparison result.

It should be noted that the above-mentioned comparison and decision procedure takes into consideration the evaluation of qualities of the reproduced speech signals as well as the distortion amount calculated based on the error correcting ability of each error correcting coder with respect to the current error rate.

Figure 6A:
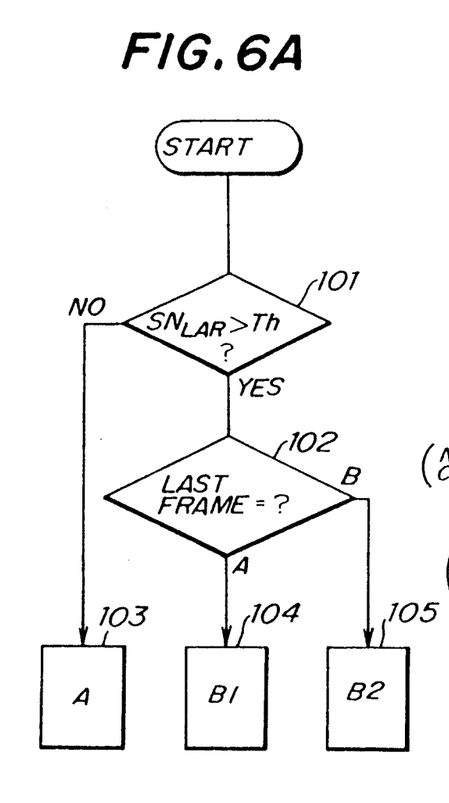
FIG. 6A and FIG. 6B are diagrams illustrating the operation of a comparison/decision unit shown in FIG. 3.
Figure 6B:
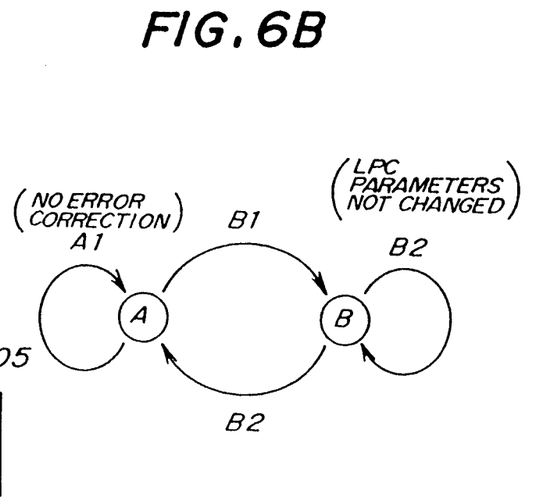

As shown in FIG. 6A and FIG. 6B, the comparison/decision unit 5 determines, at step 101, whether or not $SN_{LAR} > Th$. If $SN_{LAR} \leq Th$, A mode is selected at step 103 so that the switch 28 connects the LPC analyzer 25 and the memory 27. In A mode, the contents of the memory 27 (LPC parameters) are updated for every frame. On the other hand, if $SN_{LAR} > Th$, the switch 28 is controlled so that is selects the output of the memory 27. Either B1 or B2 mode is selected on the basis of the determination result at step 102, at which step it is determined whether the previous frame was transmitted in A mode or B mode. If it is determined that the previous frame was transmitted in A mode, B1 mode is selected at step 104. On the other hand, if the previous frame was transmitted in B mode, B2 mode is selected at step 105.

Figure 5:
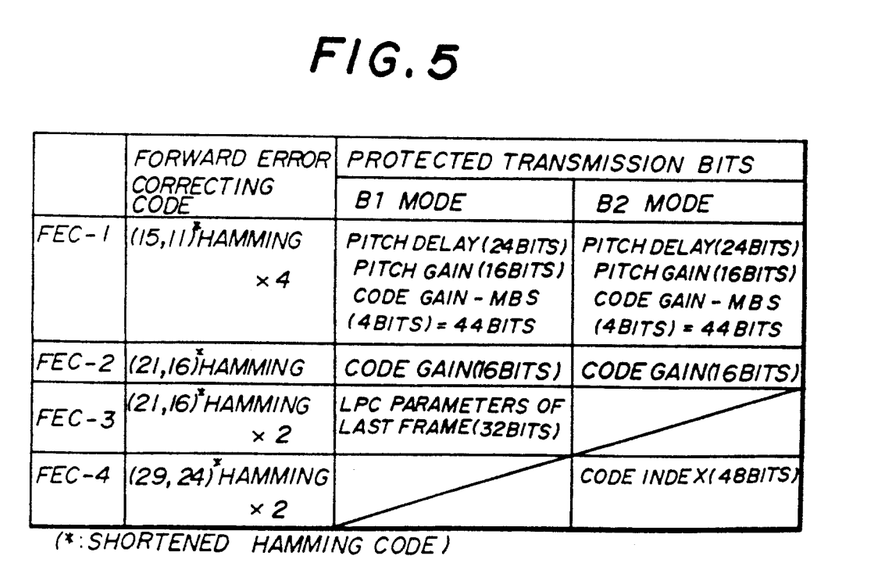
FIG. 5 is a diagram illustrating error correcting codes and protected bits.

In both the B1 and B2 modes, the bits related to the pitch prediction and the bits related to the gain (amplitude) of the code book (60 bits in total) are protected by the error correcting codes FEC1 and FEC2. In B1 mode, the LPC parameters amounting to 32 bits transmitted in the most recent A mode frame are protected by the error correcting code FEC3. On the other hand, in B2 mode, the phase (index) information about the code book consisting of 48 bits is protected by the error correcting code FEC4.

B1 mode is used only when the mode is changed from A to B, because the LPC parameters are transmitted in only A mode and unless the error correcting with FEC3 is carried out for the LPC parameters, erroneous LPC parameters will successively be used for consecutive B mode frames.

On the other hand, B2 mode is used when the B mode status is maintained. When the mode is returned to A mode from B2 mode, the condition, $SN_{LAR} \leq Th$, is satisfied.

Figure 7:
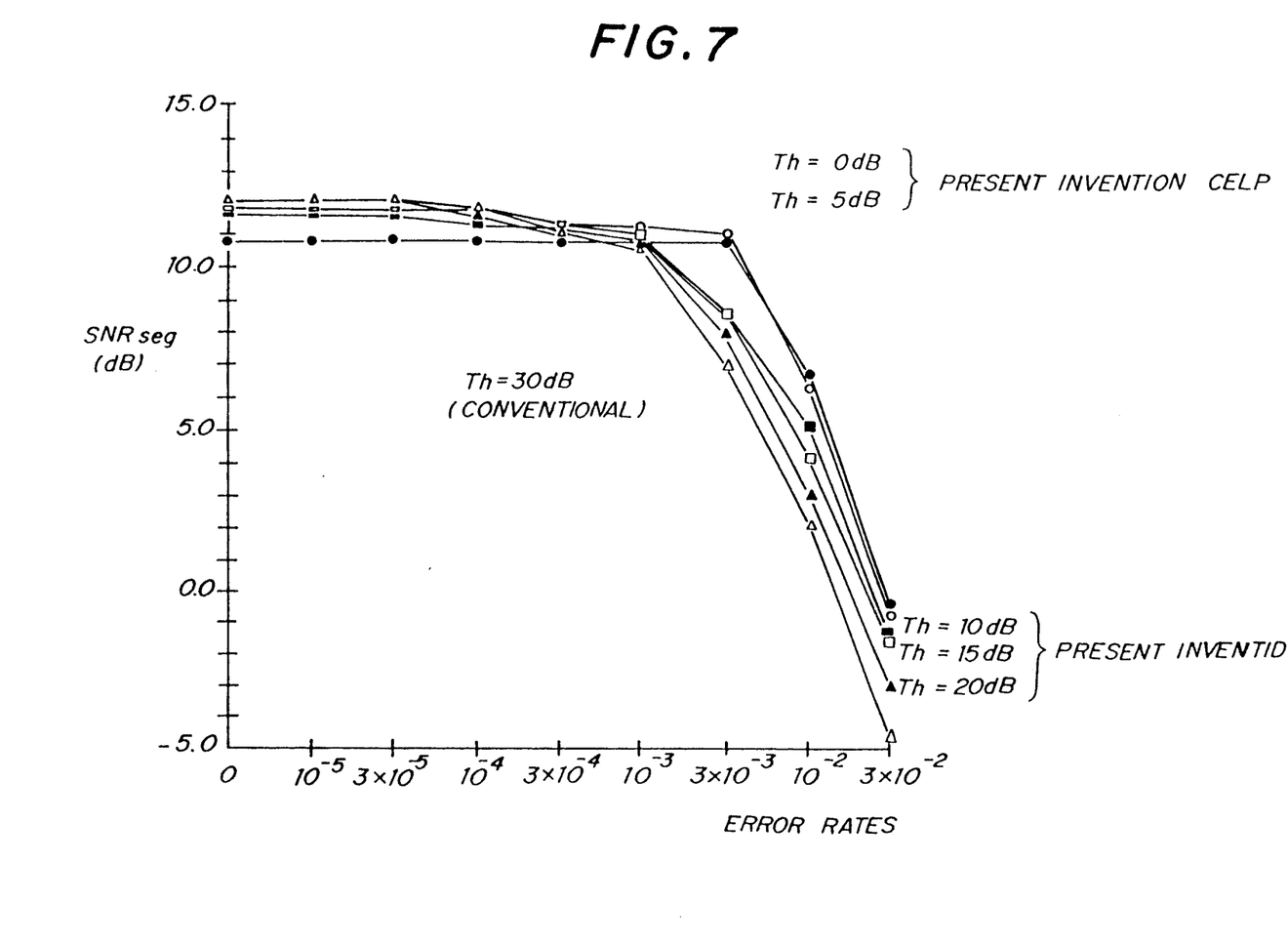
FIG. 7 is a graph illustrating the advantages presented by the present invention.

FIG. 7 is a graph illustrating segmental SNR characteristics (SNRseg) as a function of the bit error rate which were obtained by the experiments conducted by the present inventors. The threshold value Th was tested with values of 0, 5, 10, 15, 20 and 30 dB.

A curve with Th equal to 30 dB represents the characteristic of the coder $1_1$ having no bit error correction coding. It can be seen from the graph that a good characteristic is obtained at low bit rates, but the segmental SNR deteriorates greatly with the bit error rate greater than $10^{-3}$. When the threshold value Th is equal to 0 dB or 5 dB, the B mode will frequently be selected so that a high error correcting ability is provided. Thus, even when the bit error rate is equal to $3 \times 10^{-3}$, the segmental SNR deteriorates less. However, it should be noted that in these cases, the number of LPC parameters to be transmitted is extremely small and thus a great spectral distortion will occur in reproduced speech.

From the above-mentioned viewpoint, it is preferable that the threshold value Th be selected based on the error rates, as shown in Table 1.

TABLE 1

| Th | Error rate |
| --- | --- |
| $<10^{-5}$ | 30 dB |
| $10^{-5}$–$10^{-4}$ | 20 dB |
| $10^{-4}$–$3 \times 10^{-3}$ | 15 dB |
| $>3 \times 10^{-3}$ | 10 dB |

Figure 8:
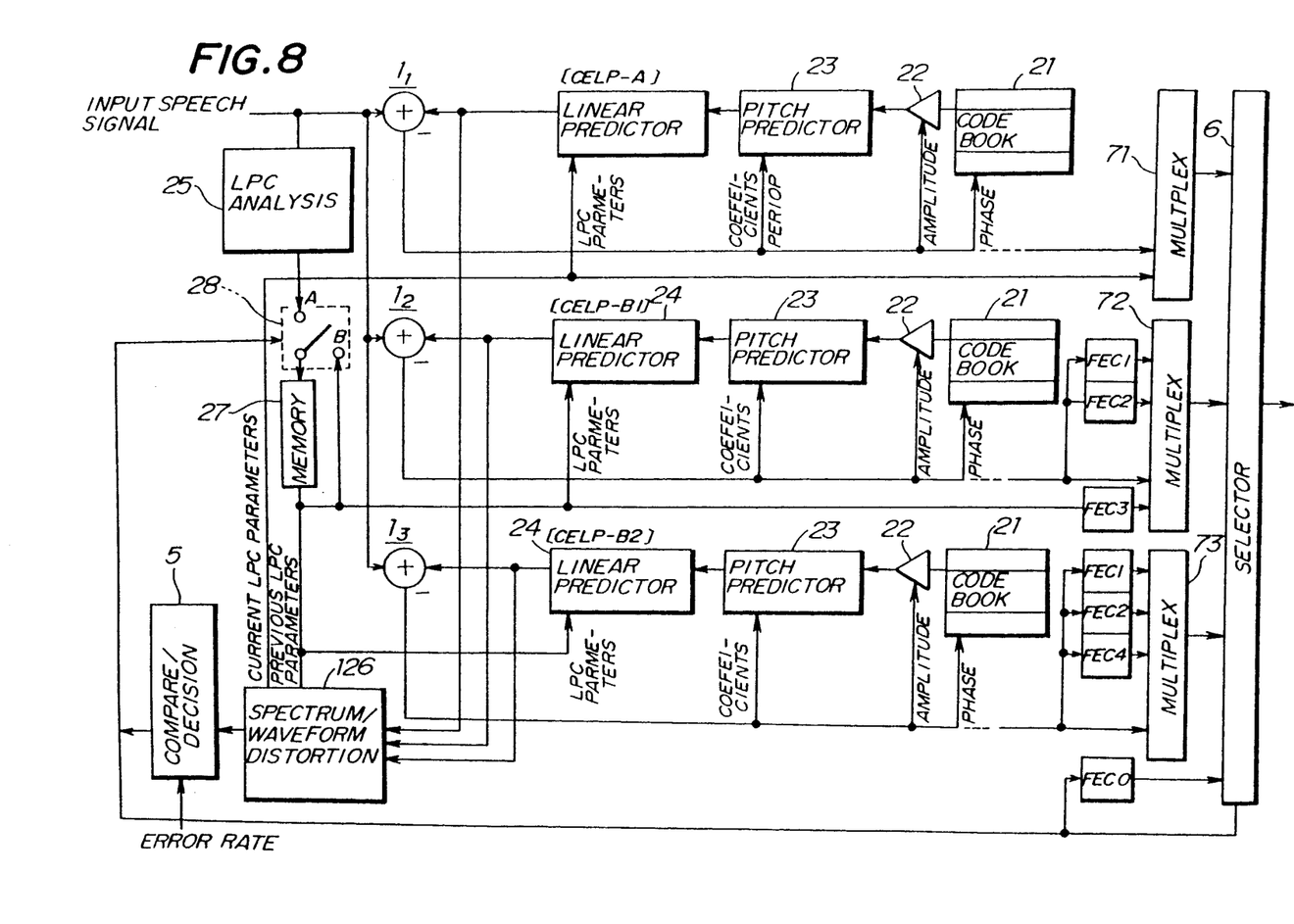
FIG. 8 is a block diagram of a speech coding apparatus according to a second preferred embodiment of the present invention.

FIG. 8 is a block diagram of a speech coding apparatus according to a second preferred embodiment of the present invention. In FIG. 8, those parts which are the same as those shown in FIG. 3 are given the same reference numerals. In FIG. 8, a spectrum/waveform distortion calculator 126 is substituted for the spectral distortion calculator 26 shown in FIG. 3. The spectrum/waveform distortion calculator 126 calculates the waveform distortion for every frame in addition to the spectral distortion. That is, the spectrum/waveform distortion calculator 126 is designed so that the function of calculating the waveform distortion is added to the function of the spectral distortion calculator 26. The waveform distortion is obtained by comparing the waveform of each of the reproduced speech signals with that of the input speech signal. Thus, the output signals of the linear predictors 24 are input to the spectrum/waveform distortion calculator 126.

Figure 9:
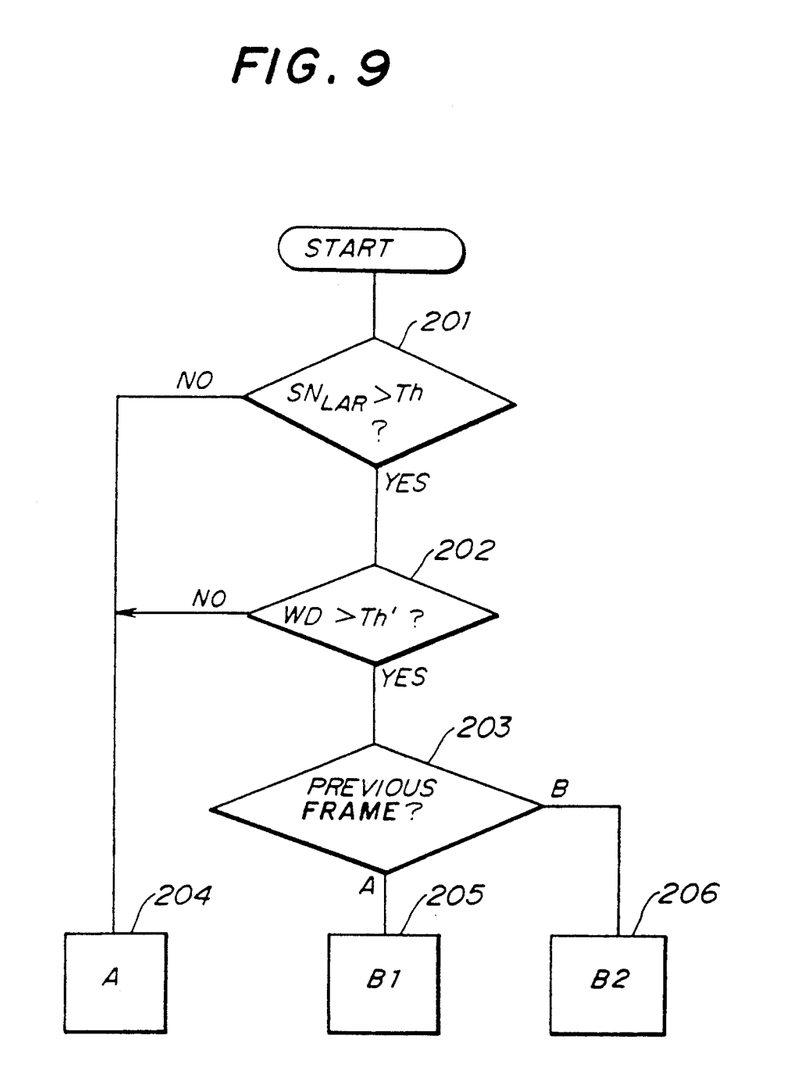
FIG. 9 is a flowchart illustrating the operation of a comparison/decision unit shown in FIG. 8.

FIG. 9 is a flowchart illustrating the operation of the comparison/decision unit 5 shown in FIG. 8. At step 201, it is determined whether $SN_{LAR} > Th$, as in step 101 (FIG. 6A). If the result is NO, A mode is selected at step 204. On the other hand, if the result at step 201 is YES, it is determined, at step 202, whether WD>Th' where WD denotes a waveform distortion obtained by the spectrum/waveform distortion calculator 126 and Th' is a threshold value which is dynamically determined based on the current bit error rate. If WD>Th', A mode is selected at step 204. On the other hand, if WD≦Th', it is determined, at step 203, whether the previous frame was transmitted in A mode or B mode. If it is determined that the previous frame was transmitted in A mode, B1 mode is selected at step 205. On the other hand, if it is determined that the previous frame was transmitted in B mode, B2 mode is selected.

The present invention is not limited to the specifically disclosed embodiments, and variations and modifications may be made without departing from the scope of the present invention.

What is claimed is:

1. A speech coding apparatus coupled to a receiving unit via a transmission channel, comprising:

m (m is an integer greater than 1) coders coding an input speech signal for every frame of said input speech signal to generate coded speech signals having mutually different bit rates;

m decoders respectively provided for said m coders and generating reproduced speech signals from said coded speech signals for every frame;

(m−1) error correcting coders provided for said m coders and carrying out, for every frame, an error correction coding for said coded speech signals to generate error correcting codes having mutually different error correcting abilities;

evaluating means, coupled to said m decoders, for evaluating a quality of each of said reproduced speech signals from said input speech signal and said reproduced speech signals and for outputting an elevated quality of each of said reproduced speech signals, said quality of each of said reproduced speech signals being evaluated in a state having no transmission error;

decision means, coupled to said evaluating means, for identifying one of said m coders which provides the reproduced speech signal having a smallest distortion on the basis of said evaluated quality of each of said reproduced speech signals, a current error rate of said transmission channel and said error correcting abilities of said (m−1) error correcting coders and for generating a coder identification number representative of said one of the m coders; and output means, coupled to said m coders, said (m−1) error correction coders and said decision means, for outputting a multiplexed transmission signal including the coded speech signal generated by said one of the m coders identified by said decision means and the error correcting code generated by a corresponding one of the (m−1) error correcting coders, the multiplexed transmission signal being used to reproduce the input speech signal in the receiving unit.

2. A speech coding apparatus as claimed in claim 1, wherein:

said decision means comprises means for providing a threshold value based on said current error rate and said error correcting abilities of said m error correcting coders and for comparing said evaluated quality of each of said reproduced speech signals with said threshold value to thereby output comparison results; and said decision means selects said one of the m coders on the basis of said comparison results.

3. A speech coding apparatus as claimed in claim 1, wherein said multiplexed transmission signal has a fixed bit rate.

4. A speech coding apparatus coupled to a receiver unit via a transmission channel, comprising:
 m (m is an integer greater than 1) coders coding an input speech signal for every frame of said input speech signal to generate coded speech signal having mutually different bit rates;
 m decoders respectively provided for said n coders and generating reproduced speech signals from said coded speech signals for every frame;
 (m−1) error correcting coders provided from (m−1) coders from among said m coders and carrying out, for every frame, an error correction coding for said coded speech signals generated by said (m−1) coders to generate error correcting codes having mutually different error correcting abilities;
 evaluating means, coupled to said m decoders, for evaluating a quality of each of said reproduced speech signals from said input speech signal and said reproduced speech signals and for outputting an evaluated quality of each of said reproduced speech signals, said quality of each of said reproduced speech signals being evaluated in a state having no transmission error;
 decision means, coupled to said evaluating means, for identifying one of said m coders which provides the reproduced speech signal having a smallest distortion on the basis of said evaluated quality of each of said reproduced speech signals, a current error rate of said transmission channel and error correcting abilities of said (m−1) error correcting coders and for generating a coder identification number representative of said one of the m coders; and
 output means, coupled to said m coders, said (m−1) error correcting coders and said decision means, for outputting a multiplexed transmission signal including the coded speech signal generated by said one of the m coders identified by said decision means and including the error correcting code generated by a corresponding one of the (m−1) error correcting coders when said one of the m coders identified by said decision means is one of (m−1) coders associated with said (m−1) error correcting coders,
 the multiplexed transmission signal being used to reproduce the input speech signal in the receiver unit.

5. A speech coding apparatus as claimed in claim 4, wherein:
 said decision means comprises means for providing a threshold value based on said current error rate and said error correcting abilities of said (m−1) error correcting coders and for comparing said evaluated quality of each of said reproduced speech signals with said threshold value to thereby output comparison results; and
 said decision means selects said one of the m coders on the basis of said comparison results.

6. A speech coding apparatus as claimed in claim 4, wherein said multiplexed transmission signal has a fixed bit rate.

7. A speech coding apparatus coupled to a receiver unit via a transmission channel, comprising:
 m (m is an integer greater than 1) coders coding an input speech signal for every frame of said input speech signal to generate coded speech signal having mutually different bit rates, each of said m coders having a linear predictor;
 analyzing means for carrying out a linear predictive coding (LPC) analysis for said input speech signal for every frame and for generating LPC parameters;
 (m−1) error correcting coders provided from (m−1) coders from among said m coders and carrying out, for every frame, an error correction coding for said coded speech signals generated by said (m−1) coders to generate error correcting codes having mutually different error correcting abilities;
 evaluating means, coupled to said analyzing means, for evaluating a quality of a reproduced speech signal reproduced by using current LPC parameters and previous LPC parameters and for outputting an evaluated quality obtained in a state having no transmission error, said evaluated quality showing a spectral distortion;
 decision means, coupled to said evaluating means, for identifying one of said m coders which provides a reproduced speech signal having a smallest distortion on the basis of said evaluated quality, a current error rate of said transmission channel and error correcting abilities of said (m−1) error correcting coders and for generating a coder identification number representative of said one of the m coders; and
 output means, coupled to said m coders, said (m−1) error correcting coders and said decision means, for outputting a multiplexed transmission signal including the coded speech signal generated by said one of the m coders identified by said decision means and including the error correcting code generated by a corresponding one of the (m−1) error correcting coders when said one of the m coders identified by said decision means is one of (m−1) coders associated with said (m−1) error correcting coders,
 the multiplexed transmission signal being used to reproduce the input speech signal in the receiver unit.

8. A speech coding apparatus as claimed in claim 7, further comprising memory means for storing said previous LPC parameters previously generated by said analyzing means and for sending said previous LPC parameters to (m−1) coders from among said m coders associated with said (m−1) error correcting coders,
 wherein said evaluating means receives said current LPC parameters from one coder other than said (m−1) coders and said previous LPC parameters from said memory means.

9. A speech coding apparatus as claimed in claim 8, wherein:
 said memory means comprises a switch and a memory having an input terminal and an output terminal;
 said switch connects the input terminal of said memory to either said analyzing means or the output terminal of said memory; and
 the output terminal of said memory is coupled to said (m−1) coders associated with said (m−1) error correcting coders.

10. A speech coding apparatus as claimed in claim 9, wherein:

said switch has a control terminal which receives said coder identification number generated by said decision means.

11. A speech coding apparatus as claimed in claim 7, wherein:
said evaluating means evaluates the quality of the reproduced speech signal by calculating an equation defined in the following expression.

$$SN_{LAR} = 10\log\Sigma\{(y_A^{(i)})^2\}/\{y_A^{(i)} - y_B^{(i)})^2\}$$

where
$Sn_{LAR}$: said evaluated quality,
$y_A^{(i)}$: said current LPC parameters, and
$y_B^{(i)}$: said previous LPC parameters.

12. A speech coding apparatus as claimed in claim 7, wherein:
said decision means comprises means for providing a threshold value based on said current error rate and said error correcting abilities of said (m−1) error correcting coders and for comparing said evaluated quality of said reproduced speech signal with said threshold value to thereby output comparison results; and
said decision means selects said one of the m coders on the basis of said comparison results.

13. A speech coding apparatus as claimed in claim 12, wherein said decision means generates said coder identification number which identifies one coder other than said (m−1) coders associated with said (m −1) error correcting coders when said evaluated quality $SN_{LAR}$ is greater than said threshold value.

14. A speech coding apparatus as claimed in claim 13, wherein when said decision means identifies one of said (m−1) coders in place of said one coder other than said (m−1) coders, said decision means generates said coder identification number which identifies one of said (m−1) coders associated with said (m−1) error correcting coders which carries out the error correcting coding for said previous LPC parameters.

15. A speech coding apparatus as claimed in claim 7, wherein the error correcting code generated by one of said (m−1) error correcting coders has error correcting bits for protecting said previous LPC parameters.

16. A speech coding apparatus as claimed in claim 7, wherein said current LPC parameters related to one of said m coders to which no said error correcting codes are provided are contained in said multiplexed transmission signal without said error correction coding.

17. A speech coding apparatus as claimed in claim 7, wherein said output means comprises:
m multiplexer units respectively provided for said m coders, each of said m multplexer units generating said multiplexed transmission signal; and
selector means, coupled to said m multiplexer units and said decision means, for selecting one of said m multiplexer units in accordance with said coder identification number generated by said decision means and for outputting said multiplexed transmission signal supplied from said one of the m multiplexers to said transmission channel.

18. A speech coding apparatus as claimed in claim 17, further comprising an error correcting coder for carrying out an error correcting coding for said coder identification number so that said coder identification number is protected by said error correcting coding.

19. A speech coding apparatus as claimed in claim 7, wherein:
each of said m coders is of a code excited linear predictive (CELP) coding type coder;
said evaluating means comprises waveform distortion evaluating means for evaluating a waveform distortion of each of m reproduced speech signals supplied from said m coders on the basis of said input speech signal and said m reproduced speech signals;
said decision means comprises means for identifying said one of the m coders on the basis of said spectral distortion and said waveform distortion.

* * * * *

UNITED STATES PATENT AND TRADEMARK OFFICE
CERTIFICATE OF CORRECTION

PATENT NO. : 5,224,167
DATED : June 29, 1993
INVENTOR(S) : Tomohiko TANIGUCHI et al.

It is certified that error appears in the above-indentified patent and that said Letters Patent is hereby corrected as shown below:

Column 13, line 8, "." (period) should be

--;-- (semi-colon).

Signed and Sealed this

First Day of March, 1994

Attest:

BRUCE LEHMAN

Attesting Officer

Commissioner of Patents and Trademarks